US012343306B2

(12) United States Patent
DeJonghe et al.

(10) Patent No.: US 12,343,306 B2
(45) Date of Patent: Jul. 1, 2025

(54) READY-TO-SELL PACKAGING UNIT CONTAINING AT LEAST ONE PHARMACEUTICAL PRODUCT, SET INCLUDING A PLURALITY OF SUCH PACKAGING UNITS AND METHOD FOR PRODUCING SUCH PACKAGING UNIT

(71) Applicant: Sanofi Pasteur, Lyons (FR)

(72) Inventors: Christophe DeJonghe, Ecully (FR); Ludovic Giroud, Marcy l'Etoile (FR); Teddy Klein, Villefontaine (FR); Philippe Revolte, Saint-Genis-Laval (FR)

(73) Assignee: Sanofi Pasteur, Lyons (FR)

(*) Notice: Subject to any disclaimer, the term of this patent is extended or adjusted under 35 U.S.C. 154(b) by 49 days.

(21) Appl. No.: 17/263,334

(22) PCT Filed: Jul. 26, 2019

(86) PCT No.: PCT/EP2019/070244

§ 371 (c)(1),
(2) Date: Jan. 26, 2021

(87) PCT Pub. No.: WO2020/021095

PCT Pub. Date: Jan. 30, 2020

(65) Prior Publication Data

US 2021/0186809 A1 Jun. 24, 2021

(30) Foreign Application Priority Data

Jul. 27, 2018 (EP) .................................... 18306021

(51) Int. Cl.
*A61J 1/05* (2006.01)
*B65D 5/42* (2006.01)
(Continued)

(52) U.S. Cl.
CPC .............. *A61J 1/05* (2013.01); *B65D 5/4204* (2013.01); *B65D 5/4233* (2013.01);
(Continued)

(58) Field of Classification Search
CPC ....... A61J 1/05; A61J 2205/50; B65D 5/4204; B65D 5/4233; B65D 5/6611; B65D 77/042; B65D 5/4237
See application file for complete search history.

(56) References Cited

U.S. PATENT DOCUMENTS 3,286,905 A * 11/1966 Farukhi .................. B65D 77/32 229/122.34
5,673,796 A * 10/1997 Tulloch ................ B65D 5/4216 206/769
(Continued)

FOREIGN PATENT DOCUMENTS

CN 1802290 7/2006
CN 202201246 4/2012
(Continued)

OTHER PUBLICATIONS

PCT International Preliminary Report on Patentability in International Application No. PCT/EP2019/070244, dated Feb. 2, 2021, 8 pages.
(Continued)

*Primary Examiner* — Ernesto A Grano
(74) *Attorney, Agent, or Firm* — Bond, Schoeneck & King, PLLC

(57) ABSTRACT

The packaging unit includes an inner enclosure (11) within which is contained each said pharmaceutical product (12), a patient or health care professional information leaflet (13) and outer enclosure (14) including: —a first outer enclosure (15) within which is contained said inner enclosure (11); and—a second outer enclosure (16) within which is con-
(Continued)

tained said first outer enclosure (15) and said information leaflet (13); said second outer enclosure (16) being provided with labelling features; said second outer enclosure having an opening (37) arranged so that traceability and anti-counterfeiting features are visible through said opening (37).

22 Claims, 4 Drawing Sheets

(51) Int. Cl.
*B65D 5/66* (2006.01)
*B65D 77/04* (2006.01)

(52) U.S. Cl.
CPC .......... *B65D 5/6611* (2013.01); *B65D 77/042* (2013.01); *A61J 2205/50* (2013.01)

(56) References Cited

U.S. PATENT DOCUMENTS

| | | | | | |
|---|---|---|---|---|---|
| 5,860,526 | A * | 1/1999 | Burke, Jr. | B65D 5/541 | 206/460 |
| 5,882,611 | A * | 3/1999 | Williams | A61L 2/186 | 414/416.03 |
| 6,047,829 | A * | 4/2000 | Johnstone | B65D 83/0463 | 229/125.125 |
| 6,412,340 | B1 * | 7/2002 | Nguyen | G01B 5/285 | 73/104 |
| 6,789,678 | B2 * | 9/2004 | Auclair | B65D 5/504 | 206/277 |
| 7,101,512 | B2 * | 9/2006 | Hahs | A61L 2/26 | 206/521 |
| 8,869,984 | B2 * | 10/2014 | Bellamah | B65D 83/0463 | 206/468 |
| 9,051,110 | B2 * | 6/2015 | Gatto | B65B 5/024 | |
| 10,710,785 | B2 * | 7/2020 | Patwardhan | B65D 5/38 | |
| 2004/0045863 | A1 * | 3/2004 | Rhoades | B65D 25/02 | 206/534 |
| 2004/0129039 | A1 * | 7/2004 | Reetz | B65D 5/4212 | 70/63 |
| 2005/0230282 | A1 * | 10/2005 | Lapsker | B65D 75/327 | 206/534 |
| 2006/0103130 | A1 * | 5/2006 | Koivukunnas | B65D 75/54 | 283/81 |
| 2008/0277305 | A1 * | 11/2008 | Wille | C11D 17/0095 | 510/447 |
| 2009/0184023 | A1 * | 7/2009 | Brollier | B65D 83/0463 | 206/469 |
| 2010/0252479 | A1 * | 10/2010 | Corroon | A61J 1/03 | 206/534 |
| 2010/0264058 | A1 * | 10/2010 | Krause | B65D 5/5088 | 206/745 |
| 2011/0155625 | A1 * | 6/2011 | Franks | C09J 7/20 | 40/675 |
| 2012/0012497 | A1 * | 1/2012 | Weston | B65D 77/0413 | 206/531 |
| 2012/0152796 | A1 * | 6/2012 | Leon Alonso | B65D 75/327 | 206/459.1 |
| 2012/0160724 | A1 * | 6/2012 | Gelardi | B65D 5/4204 | 206/459.5 |
| 2012/0181280 | A1 * | 7/2012 | Barbier | B65D 43/162 | 220/268 |
| 2012/0217260 | A1 * | 8/2012 | Sofranko | B65D 83/0472 | 221/70 |
| 2013/0037440 | A1 * | 2/2013 | Danchisin | A61K 8/38 | 206/570 |
| 2015/0287343 | A1 * | 10/2015 | Moore | B65D 77/0453 | 206/459.5 |
| 2017/0083737 | A1 * | 3/2017 | Merchan | G06V 40/1365 | |
| 2017/0240332 | A1 | 8/2017 | Cortes et al. | | |
| 2018/0250091 | A1 * | 9/2018 | Martin | A61B 50/31 | |
| 2019/0270539 | A1 * | 9/2019 | Muse | B65D 5/10 | |
| 2019/0303949 | A1 * | 10/2019 | Fischbach | B65D 5/4212 | |
| 2022/0008912 | A1 * | 1/2022 | Pfeiffer | B65D 5/4204 | |

FOREIGN PATENT DOCUMENTS

| | | |
|---|---|---|
| CN | 204050312 U | 12/2014 |
| CN | 104640778 | 5/2015 |
| EP | 0882458 | 12/1998 |
| EP | 1826129 | 8/2007 |
| GB | 2506429 | 4/2014 |
| WO | WO 2011/041543 | 4/2011 |
| WO | WO 2014/013441 | 1/2014 |
| WO | WO 2017/147149 | 8/2017 |

OTHER PUBLICATIONS

PCT International Search Report and Written Opinion in International Application No. PCT/EP2019/070244, dated Oct. 21, 2019, 11 pages.

* cited by examiner

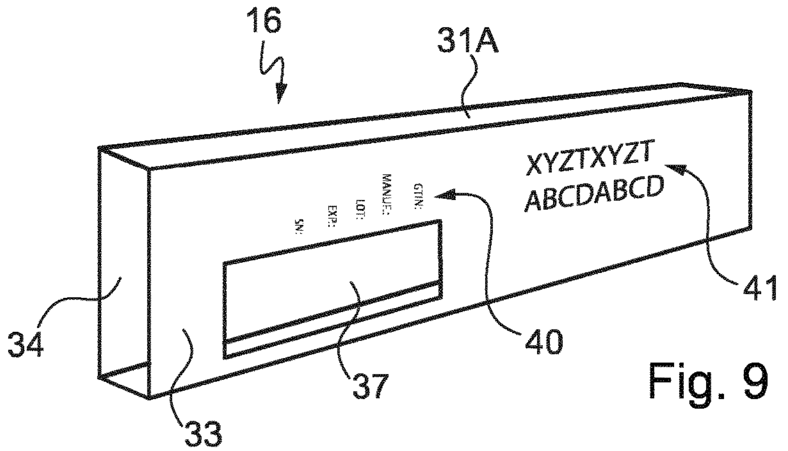
Fig. 9
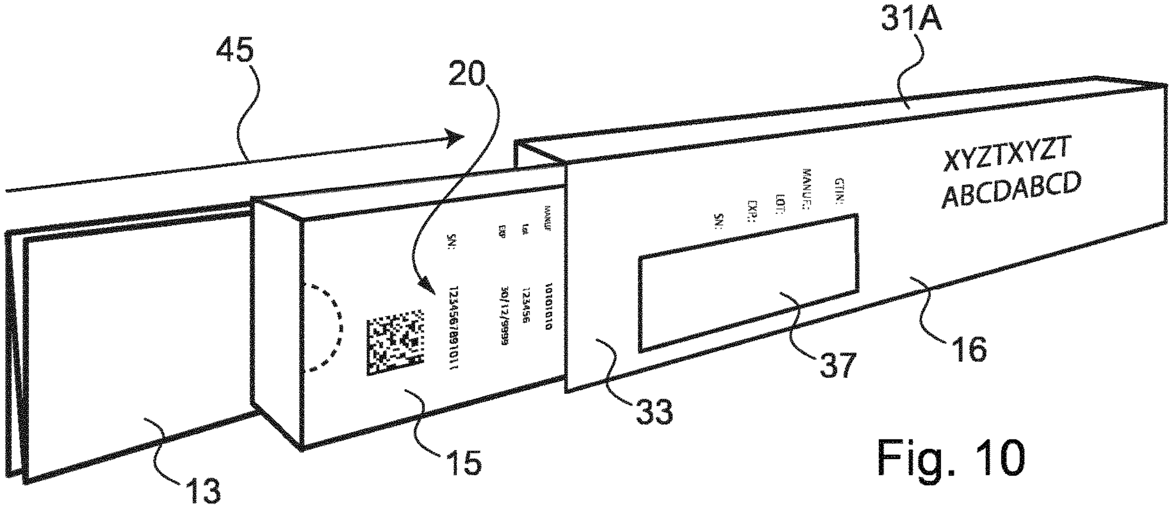
Fig. 10
Fig. 11
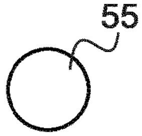
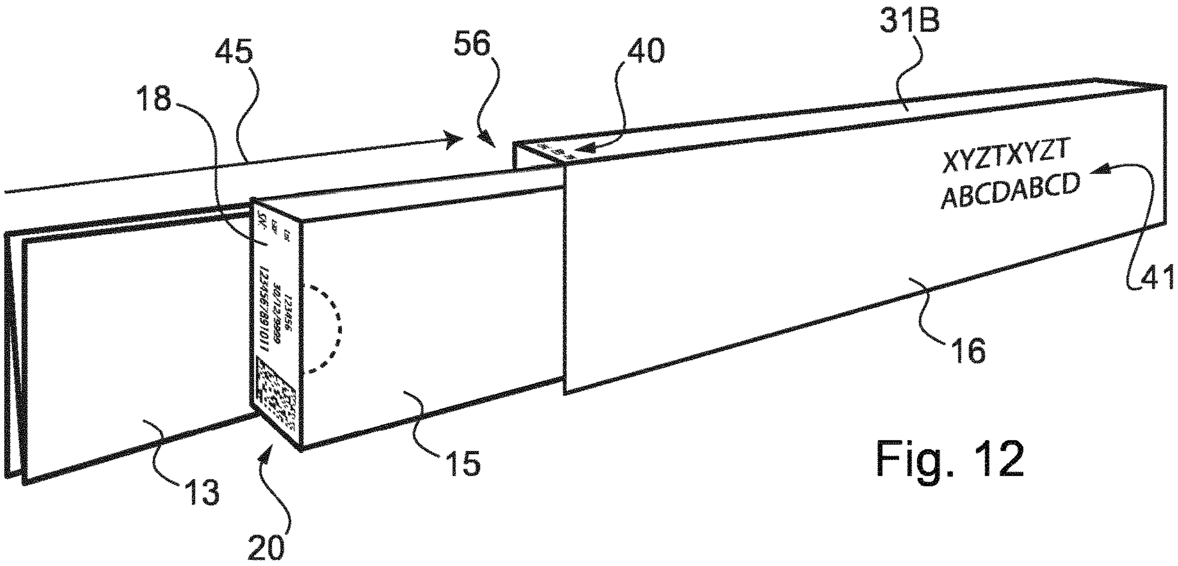
Fig. 12

READY-TO-SELL PACKAGING UNIT CONTAINING AT LEAST ONE PHARMACEUTICAL PRODUCT, SET INCLUDING A PLURALITY OF SUCH PACKAGING UNITS AND METHOD FOR PRODUCING SUCH PACKAGING UNIT

CROSS REFERENCE TO RELATED APPLICATIONS

The present application is the national stage entry of International Patent Application No. PCT/EP2019/070244, filed on Jul. 26, 2019, and claims priority to Application No. EP 18306021.9, filed on Jul. 27, 2018, the disclosures of which are incorporated herein by reference.

TECHNICAL FIELD

The disclosure relates to ready-to-sell packaging units containing at least one pharmaceutical product.

BACKGROUND

Already known packaging units of this kind include:

an inner enclosure within which is (are) contained the product(s);

a patient or health care professional information leaflet, sometimes termed a paper insert; and an outer enclosure such as a cardboard box within which are contained the inner enclosure and the information leaflet.

The inner enclosure is for instance a primary container such as a vial or a syringe body or a cartridge in direct contact with a liquid pharmaceutical product such as a dose of vaccine; or a primary container such as a blister containing solid pharmaceutical products; or the combination of one or more primary container(s) in direct contact with the pharmaceutical product with a further member such as a blister or a carton tray for holding and/or grouping the primary container(s).

The outer enclosure is provided with labelling features which are for instance the name of the product, mentions in relation with the nature and use of the product, registration code and special logo.

Many of such labelling features are dependent on the market on which the product is to be sold, for instance in regards to the language in which the mentions in relation to the nature and use of the product are to be drafted.

The same applies to the information leaflet.

The outer enclosure and the information leaflet must thus be customized to the market on which the ready-to-sell packaging unit is to be sold.

One known method for producing a ready-to-sell packaging unit for a relatively small market is to provide a ready-to-sell packaging unit produced for a relatively large market, to provide an information leaflet and an outer enclosure customized to the relatively small market, to open the outer enclosure of the ready-to-sell packaging unit produced for a relatively large market, to take the inner enclosure therein and to place this inner enclosure together with the customized information leaflet within the customized outer enclosure.

This method is becoming difficult to implement with the more and more stringent security and regulatory requirements applying to ready-to-sell pharmaceutical packaging units, which are met thanks to the provision to the outer enclosure of traceability and anti-counterfeiting features as well as anti-tampering features.

The traceability and anti-counterfeiting features are for instance batch number, manufacturing date, expiry date, 2D or 3D codes such as QR codes or Data Matrix codes, proprietary safety Label, Global Trade Item Number (GTIN) and/or serial numbers, which are affixed to the external surface of the outer enclosure, enabling to keep track and trace and/or check the authenticity of the packaging unit.

The anti-tampering features are for instance provided with glued end flaps so that the body and/or end flaps of the outer enclosure must be torn or broken for opening the outer enclosure, revealing that someone accessed to the inner enclosure. In other instances, the anti-tampering features are provided with adhesive security labels or tapes or seals which must be torn or broken for opening the outer enclosure, or with void (self-destructing) labels that leave behind semi-permanent text when removed.

The above-mentioned method for producing a ready-to-sell packaging unit for a relatively small market is becoming difficult to implement in particular because relatively complex industrial equipment is needed for providing the traceability and anti-counterfeiting features and providing the anti-tampering features.

SUMMARY

Certain aspects are directed to enabling to produce such a packaging unit with a customized information leaflet and a customized outer enclosure in a simple, convenient and economical way while complying with the more and more stringent security and regulatory requirements.

The disclosure accordingly provides in a first aspect a ready-to-sell packaging unit containing at least one pharmaceutical product, including:

an inner enclosure within which is contained each said pharmaceutical product;

a patient or health care professional information leaflet; and an outer enclosure within which are contained the inner enclosure and the information leaflet, the outer enclosure being provided with labelling features, with traceability and anti-counterfeiting features, and with anti-tampering features;

wherein said outer enclosure includes:

a first outer enclosure within which is contained the inner enclosure; the first outer enclosure being provided with said traceability and anti-counterfeiting features and with said anti-tampering features; the information leaflet being outside of the first outer enclosure; and a second outer enclosure within which is contained the first outer enclosure and the information leaflet; said second outer enclosure being provided with the labelling features; the second outer enclosure having an opening, the opening and the traceability and anti-counterfeiting features being arranged so that the traceability and anti-counterfeiting features are visible through the opening.

The disclosure is based on the observation that the information leaflet does not need to be within the enclosure bearing the features enabling to meet the product security requirements (the traceability and anti-counterfeiting features together with the anti-tampering features), provided that an outermost enclosure (herein termed the second outer enclosure) encloses the enclosure bearing the features enabling to meet the product security requirements (herein termed the first outer enclosure), provided that the information leaflet is placed between the two enclosures, and provided that the two enclosures are mutually arranged so that an opening in the second outer enclosure enables to see the traceability and anti-counterfeiting features on the first outer enclosure.

Since the second outer enclosure is provided with the labelling features enabling to meet the outer enclosure customization requirements (such as local language, registration code and special logo in accordance with the market/country requirements), and since the information leaflet is outside of the first outer enclosure, no feature needing market specific customization has to be present on or within the first outer enclosure.

The first outer enclosure can thus be used in different markets and can accordingly be manufactured in very large series.

This is very convenient and economical because it enables efficient use of the industrial equipment for producing the first outer enclosure, including the relatively complex portion of this equipment providing the traceability and anti-counterfeiting features and providing the anti-tampering features.

The production of the ready-to-sell packaging unit is relatively simple since it involves only placing the first outer enclosure and the information leaflet within the second outer enclosure, so that once the first outer enclosure is produced, the ready-to-sell packaging unit according to some aspects can be produced simply, conveniently and economically, including for small series which can even be made manually.

According to some advantageous features of the ready-to-sell packaging unit according to some aspects:

- said traceability and anti-counterfeiting features include individual alphanumeric features and the second outer enclosure has along the opening a set of headers for identifying said individual alphanumeric features;
- said first outer enclosure includes for the individual alphanumeric features a set of headers for identifying the individual alphanumeric features, the set of headers of the first outer enclosure being masked by the second outer enclosure;
- the first outer enclosure includes labelling features at least partially masked by the second outer enclosure;
- the opening is a window made in one panel of the second outer enclosure;
- the information leaflet is isolated from the window by the first outer enclosure;
- the second outer enclosure includes a body having the one panel and a further panel parallel to the one panel, the information leaflet being located between the further panel and the first outer enclosure;
- the second outer enclosure includes a body having a rectangular profile, the one panel belonging to the body and corresponding to a long side of the rectangular profile;
- the second outer enclosure has a body and end flaps;
- the second outer enclosure is a sleeve with open ends;
- the second outer enclosure is a sleeve with open ends, the opening being one of the open ends;
- the outer enclosure further includes at one end a sticker securing together the first outer enclosure and the second outer enclosure;
- the first outer enclosure includes a body having ends closed by end flaps with a glued outermost end flap so that the end flaps and the body form the anti-tampering features;
- the first outer enclosure includes an easy opening feature; and/or
- the easy opening feature is a curved line of precuts.

In a second aspect, the disclosure provides a set including a first ready-to-sell packaging unit and a second ready-to-sell packaging unit each as disclosed above, wherein the first outer enclosure is identical for the first ready-to-sell packaging unit and the second ready-to-sell packaging unit whereas the information leaflet and the outer enclosure are different for the first ready-to-sell packaging unit and the second ready-to-sell packaging.

In a third aspect, the disclosure provides a method for producing a ready-to-sell packaging unit as disclosed above, including the step of manufacturing the first outer enclosure in a first factory, the step of shipping the first outer enclosure to a second factory, the step of providing the second factory with the second outer enclosure and the information leaflet and the step of placing the first outer enclosure and the information leaflet inside the second outer enclosure.

BRIEF DESCRIPTION OF THE FIGURES

The description continues now with a detailed description of preferred embodiments given hereinafter by way of non-limiting illustration and with reference to the appended drawings. In the drawings:

FIGS. 9 and 10 are views similar to FIGS. 5 and 6 but for a variant of the packaging unit in which the second outer enclosure is a sleeve instead of a box;

FIG. 11 is a schematic view of a sticker included in this variant of the packaging unit for mutually securing the first outer enclosure and the second outer enclosure; and FIG. 12 is a view similar to FIG. 10 for a further variant of the packaging unit in which the traceability and anti-counterfeiting features are visible through one open end of the sleeve forming the second outer enclosure.

DETAILED DESCRIPTION

Figure 1:
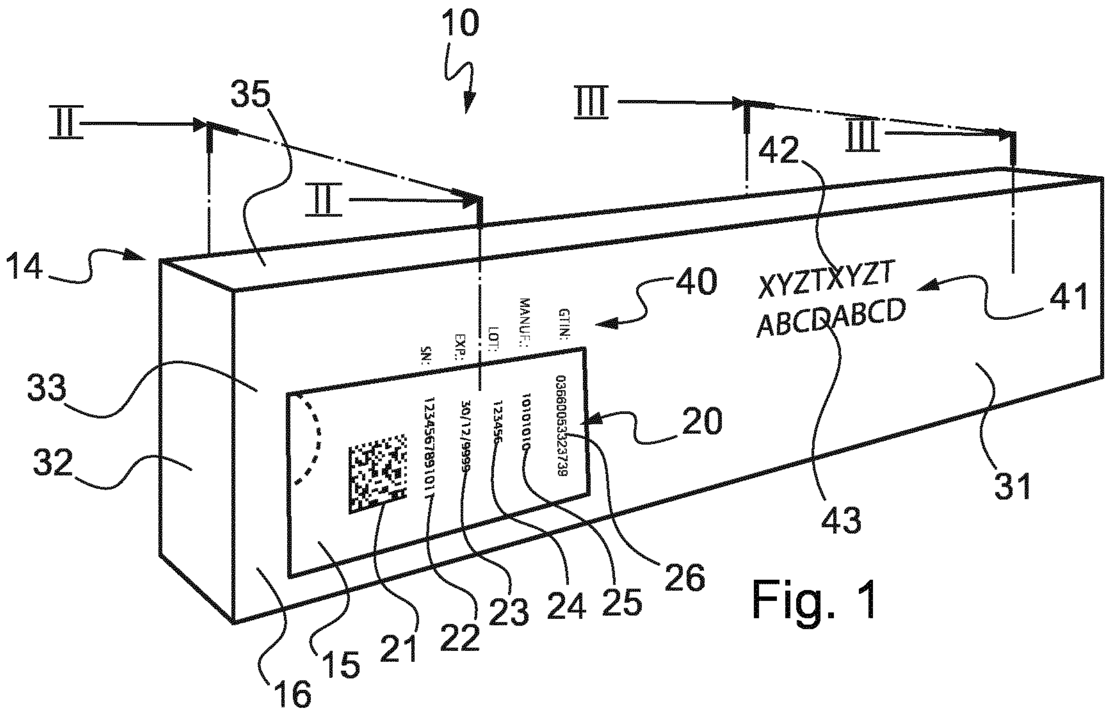
FIG. 1 is a perspective view of a ready-to-sell packaging unit.
Figure 2:
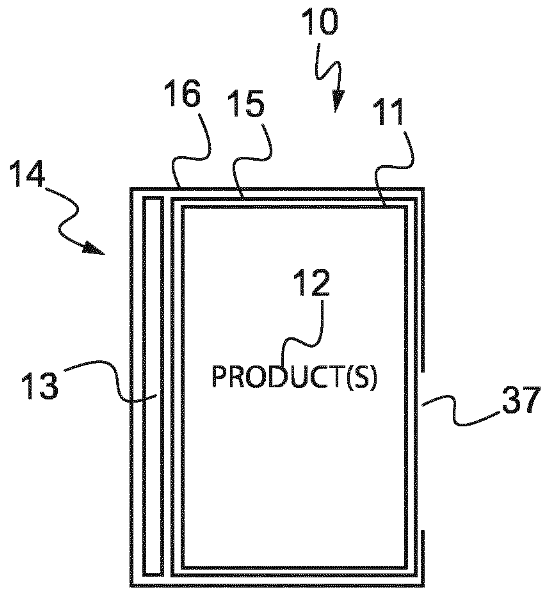
FIGS. 2 and 3 are schematic cross-section views taken as shown by II-II and III-III on FIG. 1.
Figure 3:
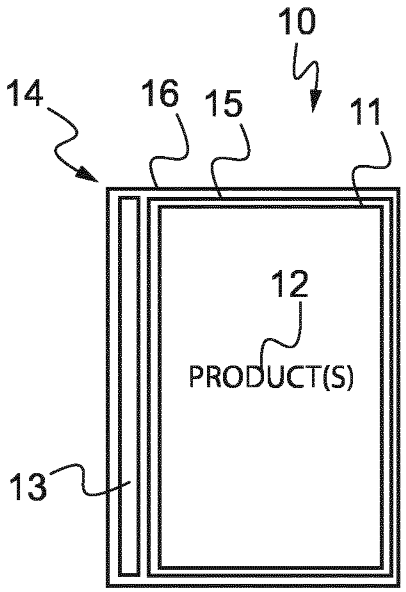
Figure 4:
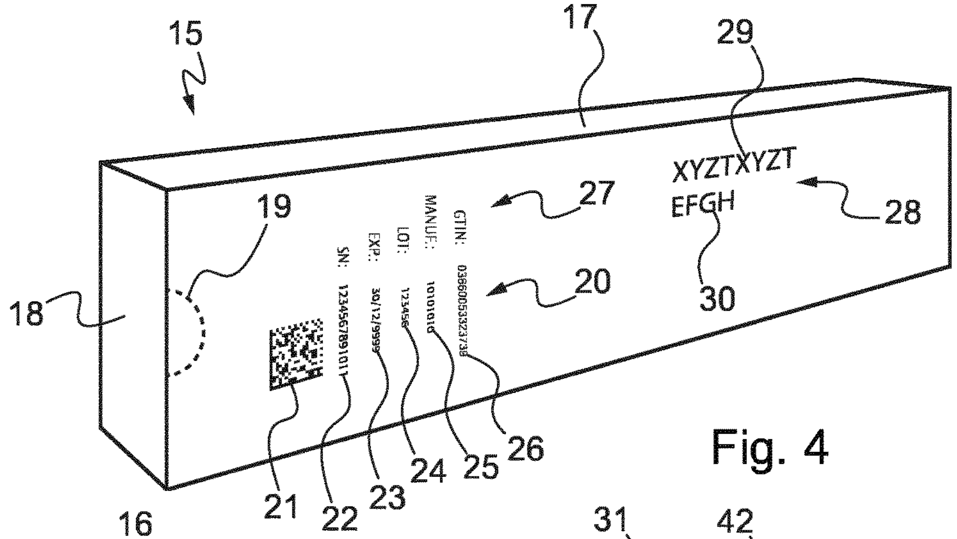
FIGS. 4 and 5 are perspective views of respectively the first outer enclosure and the second outer enclosure of the packaging unit illustrated on FIG. 1.
Figure 5:
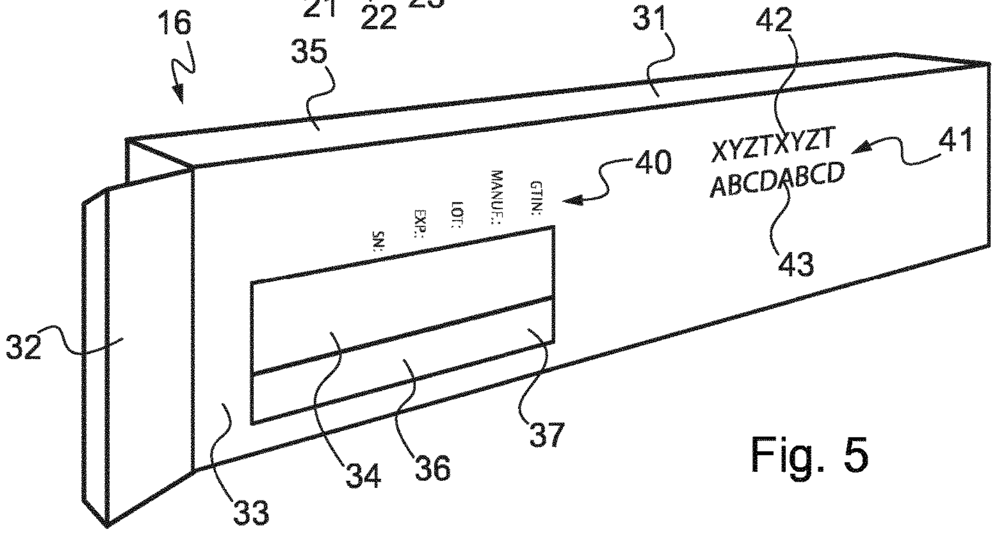

The ready-to-sell packaging unit 10 illustrated on FIGS. 1 to 3 includes an inner enclosure 11 in which is contained one or more pharmaceutical product(s) 12, a patient or health care professional information leaflet 13 and an outer enclosure 14 within which are contained the inner enclosure 11 and the information leaflet 13.

The inner enclosure 11 is for instance formed by a syringe and by a blister or carton tray holding the syringe whereas the pharmaceutical product 12 is for instance a dose of liquid vaccine to be injected, the body of the syringe containing in direct contact the dose of liquid vaccine.

In other instances, the pharmaceutical product 12 is different from a dose of vaccine and/or is solid rather than liquid, for instance tablets; the primary container in direct contact with the product 12 is different from a syringe, for instance a vial if the product is liquid or freeze-dried or a blister or a tube if the product is solid; more than one pharmaceutical product 12 is contained in the inner enclosure 11, for instance a set of a plurality of doses of vaccine each contained in a vial while a blister holds and groups the vials; and/or the inner enclosure 11 is formed only by the primary container with which the body is in direct contact, for instance a blister containing in direct contact a plurality of tablets. Other instances of products contained in a syringe or a vial are lyophilized products that are to be reconstituted extemporaneously by mixing with a liquid.

The information leaflet 13 contains medical information, recommendations of uses and the like and/or regulatory information according to the market on which the packaging unit 10 is to be sold. Such information is thus customized to this market, in particular as regards the contained information and the language used.

Here, the information leaflet 13 is a folded sheet of paper.

In the ready-to-sell packaging unit 10, the outer enclosure 14 includes a first outer enclosure 15 and a second outer enclosure 16.

Within the first outer enclosure 15 is contained the inner enclosure 11. Here, the first outer enclosure 15 is in direct contact with the inner enclosure 11.

Within the second outer enclosure 16 are contained the first outer enclosure 15 and the information leaflet 13.

Here, the second outer enclosure 16 is in direct contact with the first outer enclosure 15 and with the information leaflet 13.

The first outer enclosure 15 is here a fully closed box having a body 17 and end flaps 18.

The body 17 has a rectangular profile.

Figure 6:
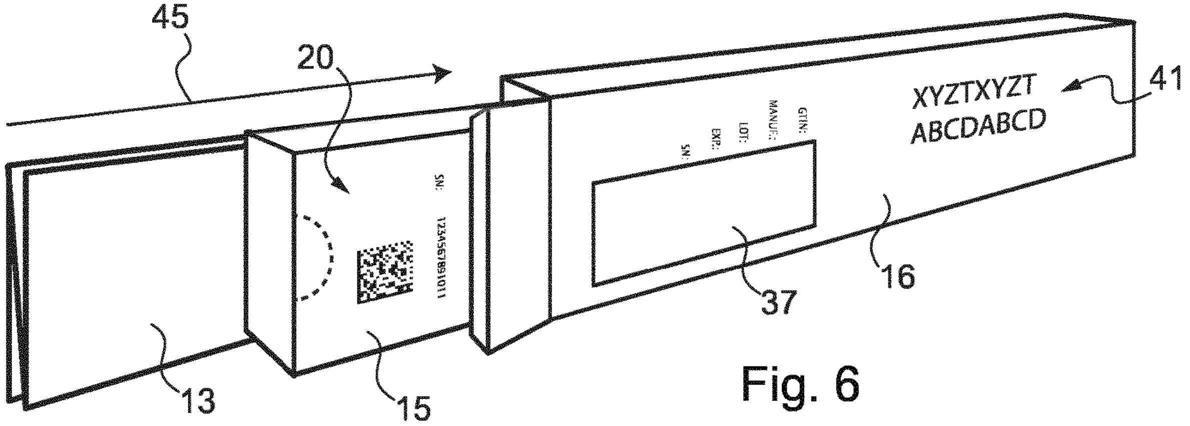
FIG. 6 is a perspective view showing the insertion of the first outer enclosure and the patient or health care professional information leaflet into the second outer enclosure.

As visible on FIGS. 2, 3 and 6 the information leaflet 13 has a width similar to the dimension of the long side of the rectangular profile of the body 17. The length of the information leaflet 13 is similar to the length of the body 17.

The end flaps 18 close the ends of the first outer enclosure 15. At each end, the outermost end flap 18 is maintained with glue to the other end flaps so that the end flaps 18 form with the body 17 an anti-tampering feature: for opening the first outer enclosure 15, the end flaps 18 and/or the body 17 must be torn or broken, revealing that someone accessed to the inner enclosure 11.

For helping the user to open the first outer enclosure 15, an easy opening feature is provided, here a curved line 19 of precuts arranged in the body 17 in the vicinity of one of its ends.

The first outer enclosure 15 is provided with traceability and anti-counterfeiting features 20, enabling to keep track and trace the authenticity of the packaging unit 10.

The traceability and anti-counterfeiting features 20 are here a Data Matrix code 21, a serial number 22, an expiry date 23, a batch number 24, a manufacturing date 25 and a Global Trade Item Number (GTIN) 26.

The serial number 22, expiry date 23, batch number 24, manufacturing date 25 and Global Trade Item Number (GTIN) 26 are individual alphanumeric features.

The traceability and anti-counterfeiting features 20 are affixed to the external surface of the first outer enclosure 15.

In addition to the traceability and anti-counterfeiting features 20, the first outer enclosure 15 includes a set 27 of headers for identifying each of the individual alphanumeric features in the traceability and anti-counterfeiting features 20.

In the set 27, each header is in line with the feature it identifies, respectively the serial number 22 (header is SN), the expiry date 23 (header is EXP), the batch number 24 (header is LOT), the manufacturing date 25 (header is MANUF) and the Global Trade Item Number 26 (header is GTIN).

The first outer enclosure 15 also has labelling features 28, here the International Non-proprietary Name (INN) and/or brand name 29 of the product(s) 12 and mentions 30 in relation with the nature and use of the product(s) 12.

The second outer enclosure 16 is here a box having a body 31 and end flaps 32.

The body 31 has a rectangular profile.

For enabling the second outer enclosure 16 to accommodate the first outer enclosure 15 and the information leaflet 13, as visible on FIGS. 2 and 3 the dimension of the long side of the rectangular profile of the body 31 is greater than the dimension of the long side of the rectangular profile of the body 17 and greater than the width of the information leaflet 13; the dimension of the short side of the rectangular profile of the body 31 is greater than the sum of the dimension of the short side of the rectangular profile of the body 17 and the thickness of the information leaflet 13; and the length of the body 31 is greater than the length of the first outer enclosure 15 and greater than the length of the information leaflet 13.

Due to its rectangular profile, the body 31 has two main panels 33 and 34 each corresponding to a respective long side of the rectangular profile, and two lateral panels 35 and 36 each corresponding to a respective short side of the rectangular profile.

A window 37 is made in the main panel 33, here by a rectangular cut-out.

Except the window 37, the main faces 33 and 34 and the lateral faces 35 and 36 of the body 31 are solid and opaque.

In the ready-to-sell packaging unit 10, the window 37 and the traceability and anti-counterfeiting features 20 are arranged so that the traceability and anti-counterfeiting features 20 are visible through the window 37.

Here, the long sides of the window 37 are parallel to the long sides of the main panel 33 and the short sides of the window 37 are parallel to the short sides of the main panel 33.

Here, the window 37 is near a corner of the main panel 33 while being away from the sides of the main panel 33.

The traceability and anti-counterfeiting features 20 are also located on a main panel of the body 17 of the first outer enclosure 15, away from the sides of this main panel.

Here, the set 27 of headers is masked by the main panel 33 along one side of the window 37 and the body 31 includes along that side of the window 37 a set 40 of headers for identifying each of the features 20, except the Data Matrix 21 for which there is no header.

Here, the set 40 is similar to the set 27: each header of the set 40 is in line with the feature it identifies, respectively the serial number 22 (header is SN), the expiry date 23 (header is EXP), the batch number 24 (header is LOT), the manufacturing date 25 (header is MANUF) and the Global Trade Item Number 26 (header is GTIN).

The second outer enclosure 16 is provided with labelling features 41, here the International Non-proprietary Name (INN) and/or brand name 42 of the product(s) 12 and mentions 43 in relation with the nature of the product(s) 12.

The ready-to-sell packaging unit 10 is prepared simply by placing the first outer enclosure 15 and the information leaflet 13 within the second outer enclosure 16 as shown by the arrow 45 on FIG. 6 and then folding the flaps 32 at each end of the body 31.

In the ready-to-sell packaging unit 10 the information leaflet 13 is placed between the first outer enclosure 15 and the second outer enclosure 16.

Here, the information leaflet 13 is placed on the side of the first outer enclosure 15 which is away from the window 37, so that the information leaflet 13 is isolated from the window 37 by the first outer enclosure 15 which is interposed between the information leaflet 13 and the window 37.

For further helping the retention of the information leaflet 13 within the second outer enclosure 16, there is a slight compression of the information leaflet 13 between the first outer enclosure 15 and the second outer enclosure 16.

The end flaps 32 provide a further retention of the information leaflet 13 within the second outer enclosure 16.

For opening the ready-to-sell packaging unit 10, the end flaps 32 of one end of the second outer enclosure 16 are unfolded, the first outer enclosure 15 and the information leaflet 13 are taken out, the first outer enclosure 15 is opened thanks to the easy opening feature 19 and the inner enclosure 11 is taken out.

The labelling features 41 of the second outer enclosure 16 enables the ready-to-sell packaging unit 10 to meet the customization requirements such as local language, registration code and special logo.

Since the information leaflet 13 is outside of the first outer enclosure 15, no feature needing market specific customization has to be present on or within the first outer enclosure 15.

The first outer enclosure 15 can thus be used in different markets and can accordingly be manufactured in very large series.

This is very convenient and economical because it enables efficient use of the industrial equipment for producing the first outer enclosure 15, including the relatively complex portion of this equipment providing the traceability and anti-counterfeiting features 20 and providing the glued outermost end flaps 18 forming with the body 17 the anti-tampering features of the first outer enclosure 15.

Once the first outer enclosure 15 is produced, the production of the ready-to-sell packaging unit 10 involves only placing the first outer enclosure 15 and the information leaflet 13 within the second outer enclosure 16.

The ready-to-sell packaging unit 10 can thus be produced simply, conveniently and economically, including for small series which can even be made manually.

Figure 7:
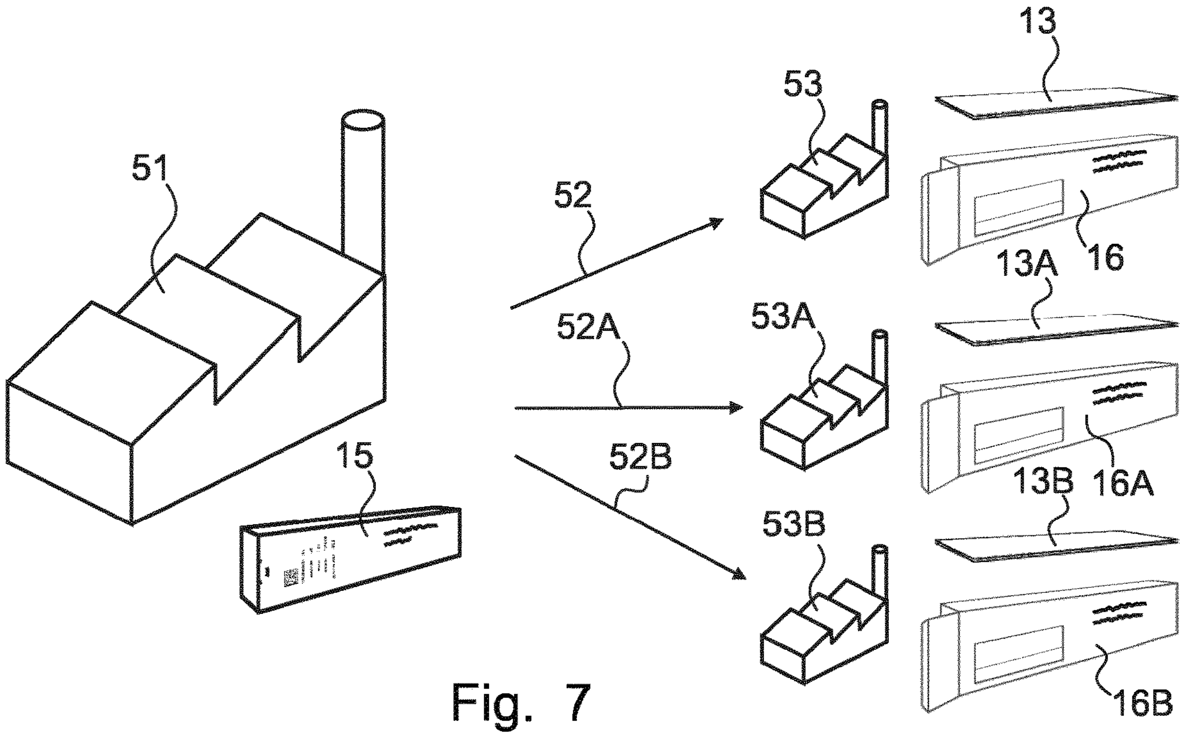
FIG. 7 is a diagrammatic view showing a central factory in which the first outer enclosure is manufactured and three different local factories in which ready-to-sell packaging units are produced with the first outer enclosure manufactured at the central factory.

FIG. 7 illustrates a method for producing a ready-to-sell packaging unit 10 in which the step of manufacturing the first outer enclosure 15 is carried out in a first factory 51, then the first outer enclosure 15 is shipped as shown by the arrow 52 to a second factory 53, the second outer enclosure 16 and the information leaflet 13 are provided to the second factory 53, and the step of placing the first outer enclosure 15 and the information leaflet 13 inside the second outer enclosure 16 is carried out at the second factory 53.

More precisely, in the method illustrated on FIG. 7, the first factory 51 is a central factory manufacturing the first outer enclosure 15 in very large series.

The first outer enclosures 15 manufactured at the central factory 51 are shipped as shown by the arrows 52, 52A and 52B to different local factories, here the second factory 53 and two other local factories 53A and 53B.

The second outer enclosure 16 and the information leaflet 13 provided to the local factory 53 are customized to the requirements of the market on which the packaging units 10 produced by the local factory 53 are to be sold.

The second outer enclosure 16A and the information leaflet 13A provided to the local factory 53A are customized to the requirements of the market on which the packaging units 10A (FIG. 8) produced by the local factory 53A are to be sold.

The second outer enclosure 16B and the information leaflet 13B provided to the local factory 53B are customized to the requirements of the market on which the packaging units 10B (FIG. 8) produced by the local factory 53B are to be sold.

Figure 8:
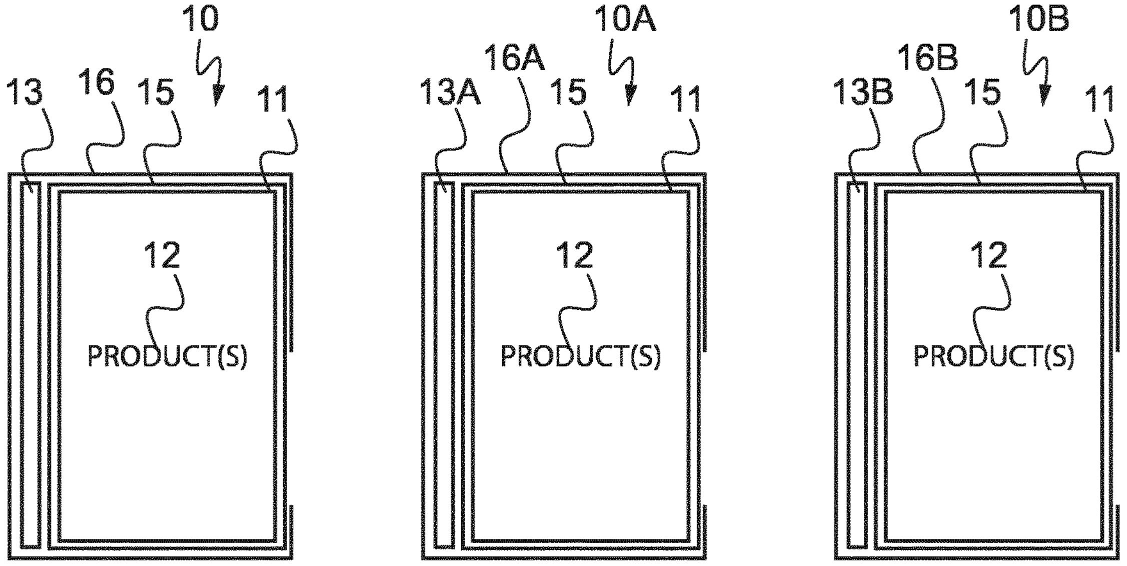
FIG. 8 is a schematic view of a set of three different packaging units each produced at a respective local factory, the different packaging units being illustrated as on FIG. 2.

In the set of different ready-to-sell packaging units 10, 10A and 10B shown in FIG. 8, the first outer enclosure 15 is identical for the three packaging units 10, 10A and 10B whereas the information leaflet 13, 13A or 13B and the second outer enclosure 16, 16A or 16B are different for the three ready-to-sell packaging units 10, 10A and 10B.

In non-illustrated variants, the central factory 51 ships the first outer enclosures 15 to only two different local factories or to more than three different local factories, for instance eighteen different local factories each providing a respective market.

In non-illustrated variants, the first outer enclosure 15 has no labelling features 28.

It should be noted in this respect that the labelling features 28 are masked by the second outer enclosure 16, 16A or 16B in the ready-to-sell packaging units 10, 10A and 10B so that they are not useful in these packaging units but that the labelling features 28 may be useful for meeting regulatory requirements for shipping the first outer enclosures 15 to the local factories, in particular regulations of certain countries regarding importation of pharmaceutical products. The labelling features 28 may thus be drafted in a language (or a couple of languages) easily read in a number of countries, for instance English and/or Spanish and/or French.

The labelling features 28 may also be used for drawing attention to the fact that the first outer enclosure is a semi-finished product not ready to be put on the market. It is noted in this respect that a packaging unit containing pharmaceutical products but no information leaflet is not ready to be put on the market because it is not compliant with typical regulatory requirements.

For simplifying the drawings, the labelling features 28 and 41 are shown on a main panel of the first outer enclosure 15 or the second outer enclosure 16, but it is understood that such labelling features can be affixed anywhere on the first outer enclosure 15 or the second outer enclosure 16.

In non-illustrated variants, the set of different ready-to-sell packaging units is produced in a same factory.

FIGS. 9 and 10 illustrate a variant of the ready-to-sell packaging unit 10 in which the second outer enclosure 16 is a sleeve 31A similar to the body 31 but opened at each end (there is no end flaps 32).

As mentioned above, for further helping the retention of the information leaflet 13 within the second outer enclosure 16, there is a slight compression of the information leaflet 13 between the first outer enclosure 15 and the second outer enclosure 16. This is very useful in this variant in which the second outer enclosure 16 is opened at each end.

For helping the user to access or grip the first outer enclosure 15, a recess or a cut-out can be provided at one end of the second outer enclosure 16, for instance in the main panels 33 and 34 of the body 31A.

For preventing the information leaflet 13 from leaving the ready-to-sell packaging unit 10, a sticker 55 (FIG. 11) is used at one end of the packaging unit 10 for securing together the first outer enclosure 15 and the second outer enclosure 16.

The sticker 55 is here a simple transparent sticker. Other examples for the sticker 55 is a simple non-transparent sticker or a tamper evident sticker (also named void label or tamper evident label) configured for leaving behind a word message, for instance the word "open", on both the sticker and the enclosure to which it was applied, if an attempt is made to remove the sticker.

The opening of this variant of the ready-to-sell packaging unit 10 with the body 31A is similar except that the sticker 55 is taken out instead of unfolding the end flaps 32.

Since the end flaps 18 of the first outer enclosure 15 are visible through the open ends of the sleeve 31A, it is possible to have on the end flaps 18 a portion of the labelling features 28 intended not be masked by the second outer enclosure, for instance a manufacturer logo.

FIG. 12 illustrates a variant of the ready-to-sell packaging unit 10 similar to the variant shown on FIGS. 9 to 11 but in which there is a sleeve 31B instead of the sleeve 31A.

The sleeve 31B is similar to the sleeve 31A but without window 37, the opening through which the traceability and anti-counterfeiting features 20 are visible being the open end 56 of the sleeve 31B seen at the left on FIG. 12.

In this variant, the traceability and anti-counterfeiting features 20 are affixed on the end flaps 18 of the corresponding end of the first outer enclosure 15 and the set 40 of headers of the second outer enclosure 16 are affixed along the open end 56.

In non-illustrated variants, the information leaflet 13 is different from a folded sheet of paper, for instance a paper book; and/or the length and/or width of the information leaflet 13 is smaller than the length and/or width of the body 17.

In non-illustrated variants, the anti-tampering feature of the first outer enclosure is provided differently than with glued end flaps such as 18, for instance with adhesive security labels or tapes or seals or tamper evident stickers which must be torn or broken for opening the first outer enclosure; and/or the end flaps 32 of the body 31 of the second outer enclosure 16 can also be glued or sealed with any other suitable anti-tampering feature.

In non-illustrated variants, the Data Matrix code such as 21 is replaced by a different 2D or 3D code such as QR code or replaced by a proprietary safety Label and/or the traceability and anti-counterfeiting features include a hologram, a microprinting, a Guilloche-pattern and/or a heat and UV-sensitive label.

In non-illustrated variants, the set 40 of headers is different from the set 27 of headers, for instance in another language such as a translation into the language of the country/market; the location of the headers of the set 40 and/or 27 is different from in line with the identified features, for instance the headers are grouped; there is no set of headers 27; and/or the window 37 is located and/or arranged differently, for instance remote from any corner of the main panel 33 (instead of near a corner) and/or with an outline partially curved (instead of a rectangular outline).

In non-illustrated variants, the general form of the ready-to-sell packaging unit is different from parallelepiped, for instance another polyhedral form.

In non-illustrated variants, the second outer enclosure 16 is not in an opaque material but in a transparent material and includes no labelling features such as 41 since the labelling features 28 of the first outer enclosure 15 are visible through the transparent material and includes no window such as 37 since the traceability and anti-counterfeiting features such as 20 can be seen through the transparent material and/or through an open end such as 56.

Numerous other variants are possible according to the circumstances and it is reminded in this respect that the invention is not limited to the described and drawn embodiments.

The packaging unit includes an inner enclosure within which is contained each said pharmaceutical product, a patient or health care professional information leaflet and outer enclosure including:

a first outer enclosure within which is contained the inner enclosure; and a second outer enclosure within which is contained the first outer enclosure and the information leaflet; the second outer enclosure being provided with labelling features; the second outer enclosure having an opening arranged so that traceability and anti-counterfeiting features are visible through the opening.

The invention claimed is:

1. A set of packaging units including a first ready-to-sell packaging unit and a second ready-to-sell packaging unit, each of the first and second ready-to-sell packaging units containing at least one pharmaceutical product and comprising:

an inner enclosure within which the at least one pharmaceutical product is contained;

a patient or health care professional information leaflet; and an outer enclosure within which the inner enclosure and the information leaflet are contained, the outer enclosure being provided with labelling features, with traceability and anti-counterfeiting features, and with anti-tampering features of the ready-to-sell packaging unit, wherein the outer enclosure includes:

a first outer enclosure within which the inner enclosure is contained, the first outer enclosure being provided with the traceability and anti-counterfeiting features and with the anti-tampering features, the information leaflet being outside of the first outer enclosure; and a second outer enclosure within which the first outer enclosure and the information leaflet are contained, the second outer enclosure being provided with the labelling features, the second outer enclosure having an opening, the opening and the traceability and anti-counterfeiting features being arranged so that the traceability and anti-counterfeiting features are visible through the opening;

wherein the pharmaceutical product and the first outer enclosure are identical for the first ready-to-sell packaging unit and the second ready-to-sell packaging unit, whereas the information leaflet and the second outer enclosure are different for the first ready-to-sell packaging unit and the second ready-to-sell packaging unit and customized to respective requirements of markets in which the first and second ready-to-sell packaging units are to be sold.

2. The set of packaging units according to claim 1, wherein the traceability and anti-counterfeiting features include individual alphanumeric features and the second outer enclosure has along the opening a set of headers for identifying the individual alphanumeric features.

3. The set of packaging units according to claim 2, wherein the first outer enclosure includes a set of headers for identifying the individual alphanumeric features, the set of headers of the first outer enclosure being masked by the second outer enclosure.

4. The set of packaging units according to claim 3, wherein the set of headers of the first outer enclosure is different from the set of headers of the second outer enclosure.

5. The set of packaging units according to claim 1, wherein the first outer enclosure includes labelling features at least partially masked by the second outer enclosure.

6. The set of packaging units according to claim 1, wherein the opening is a window made in one panel of the second outer enclosure.

7. The set of packaging units according to claim 6, wherein the information leaflet is isolated from the window by the first outer enclosure.

8. The set of packaging units according to claim 7, wherein the second outer enclosure includes a body having the one panel and a further panel parallel to the one panel, the information leaflet being located between the further panel and the first outer enclosure.

9. The set of packaging units according to claim 6, wherein the second outer enclosure includes a body having a rectangular profile, the one panel belonging to the body and corresponding to a long side of the rectangular profile.

10. The set of packaging units according to claim 6, wherein the second outer enclosure is opaque except for the window.

11. The set of packaging units according to claim 1, wherein the second outer enclosure has a body and end flaps.

12. The set of packaging units according to claim 1, wherein the second outer enclosure is a sleeve with open ends.

13. The set of packaging units according to claim 1, wherein the second outer enclosure is a sleeve with open ends, the opening being one of the open ends.

14. The set of packaging units according to claim 13, wherein the outer enclosure further includes at one end a sticker securing together the first outer enclosure and the second outer enclosure.

15. The set of packaging units according to claim 1, wherein the first outer enclosure includes a body having ends closed by end flaps with a glued outermost end flap so that the end flaps and the body form the anti-tampering features.

16. The set of packaging units according to claim 15, wherein the first outer enclosure includes an easy opening feature.

17. The set of packaging units according to claim 16, wherein the easy opening feature is a curved line of precuts.

18. The set of packaging units according to claim 1, wherein the second outer enclosure includes anti-tampering features.

19. The set of packaging units according to claim 1, wherein the first outer enclosure of each ready-to-sell packaging unit comprises an easy opening feature that is at least partially visible through the opening of a respective second outer enclosure.

20. The set of packaging units according to claim 1, wherein the first outer enclosure of each ready-to-sell packaging unit comprises end flaps aligned with end flaps of a respective second outer enclosure and with an easy opening feature of the first outer enclosure.

21. The set of packaging units according to claim 1, wherein one end of the second outer enclosure includes a recess and/or cut-out configured to provide a grip for a user.

22. A method for producing ready-to-sell packaging units to form a set of first and second ready-to-sell packaging units, each of the first and second ready-to-sell packaging units containing at least one pharmaceutical product and comprising an inner enclosure within which at least one pharmaceutical product is contained; a patient or health care professional information leaflet; and an outer enclosure within which the inner enclosure and the information leaflet are contained, the outer enclosure being provided with labelling features, with traceability and anti-counterfeiting features, and with anti-tampering features of the ready-to-sell packaging unit, wherein the outer enclosure includes: a first outer enclosure within which the inner enclosure is contained; the first outer enclosure being provided with the traceability and anti-counterfeiting features and with the anti-tampering features, the information leaflet being outside of the first outer enclosure; and a second outer enclosure within which the first outer enclosure and the information leaflet are contained, the second outer enclosure being provided with the labelling features, the second outer enclosure having an opening, the opening and the traceability and anti-counterfeiting features being arranged so that the traceability and anti-counterfeiting features are visible through the opening; wherein the pharmaceutical product and the first outer enclosure are identical for the first ready-to-sell packaging unit and the second ready-to-sell packaging unit, whereas the information leaflet and the second outer enclosure are different for the first ready-to-sell packaging unit and the second ready-to-sell packaging unit and customized to respective requirements of markets in which the first and second ready-to-sell packaging units are to be sold, the method including:

- manufacturing the first outer enclosures which are identical in a first factory;
- shipping the first outer enclosures to several local second factories located in different markets in which the first and second ready-to-sell packaging units are to be sold;
- providing the local second factories with the second outer enclosures and the information leaflets which are different and customized to respective requirements of the markets corresponding to the local second factories and in which the first and second ready-to-sell packaging units are to be sold; and
- placing the first outer enclosures and the respective information leaflets inside the respective second outer enclosures.

* * * * *